(12) United States Patent
Markley et al.

(10) Patent No.: US 6,931,781 B2
(45) Date of Patent: Aug. 23, 2005

(54) FISHING ROD

(75) Inventors: Duane C. Markley, Veradale, WA (US); Ron Stokes, Veradale, WA (US)

(73) Assignee: Eagle Mountain Brokers, Inc., Spokane Valley, WA (US)

( * ) Notice: Subject to any disclaimer, the term of this patent is extended or adjusted under 35 U.S.C. 154(b) by 0 days.

(21) Appl. No.: 10/607,285

(22) Filed: Jun. 25, 2003

(65) Prior Publication Data

US 2005/0005499 A1 Jan. 13, 2005

(51) Int. Cl.$^7$ .............................................. A01K 87/00
(52) U.S. Cl. .................................................. 43/18.1 R
(58) Field of Search ...................... 43/18.1 R, 18.1 CT

(56) References Cited

U.S. PATENT DOCUMENTS

| | | | |
|---|---|---|---|
| 1,962,232 A | * 6/1934 | Clairon | 43/18.1 R |
| 2,005,081 A | 6/1935 | Gephart | 43/23 |
| 2,306,638 A | * 12/1942 | Meisler | 43/18.1 R |
| 2,351,734 A | * 6/1944 | Backe | 43/18.1 CT |
| 2,394,706 A | * 2/1946 | Makie | 43/18.1 R |
| 2,478,131 A | * 8/1949 | Rossi | 43/18.1 R |
| 2,483,519 A | 10/1949 | Bishoff | 43/22 |
| 2,538,306 A | * 1/1951 | Fox et al. | 43/18.1 R |
| 2,538,338 A | 1/1951 | Sturdevant | 43/18.1 R |
| 2,541,759 A | 2/1951 | Hamre | 43/18.1 CT |
| 2,546,079 A | * 3/1951 | Seviola | 43/18.1 CT |
| 2,549,295 A | * 4/1951 | Derby | 43/18.1 R |
| 2,559,834 A | 7/1951 | Briney | 43/18.1 R |
| 2,559,933 A | 7/1951 | Briney | 43/18.1 R |
| 2,610,427 A | 9/1952 | Caroland | 43/18.1 R |
| 2,759,288 A | * 8/1956 | Bratek | 43/18.1 R |
| 2,777,239 A | * 1/1957 | Cushman | 43/18.1 R |
| 2,809,461 A | * 10/1957 | Atols | 43/18.1 R |
| 3,143,822 A | 8/1964 | Schooley | 43/17 |
| 3,216,144 A | 11/1965 | Vojinov | 43/18.1 R |
| 3,245,169 A | * 4/1966 | Kennel | 43/18.1 CT |
| 3,270,457 A | * 9/1966 | Wells | 43/18.1 R |
| 3,415,002 A | * 12/1968 | Schaefer | 43/18.1 R |
| 3,507,069 A | * 4/1970 | Borba, Sr. | 43/18.1 R |
| 3,811,215 A | 5/1974 | Fleischer | 43/18.1 CT |
| 4,027,419 A | 6/1977 | Popeil | 43/18.1 CT |
| 4,130,960 A | * 12/1978 | Fontenot | 43/18.1 R |
| 4,162,587 A | * 7/1979 | Dethlefs | 43/18.1 CT |
| 4,654,994 A | * 4/1987 | Roberts, Jr. | 43/18.1 R |
| 4,905,398 A | * 3/1990 | Botbyl | 43/18.1 R |
| 4,995,188 A | * 2/1991 | Ewing | 43/18.1 R |
| 4,996,789 A | 3/1991 | Hoover | 43/24 |
| 5,199,206 A | * 4/1993 | Richardson | 43/18.1 R |
| 5,444,934 A | 8/1995 | LaTouche | 43/18.1 CT |
| 5,704,157 A | * 1/1998 | Utsuno et al. | 43/18.1 R |
| 5,864,980 A | * 2/1999 | Lai | 43/18.1 CT |
| 5,934,005 A | * 8/1999 | Utsuno et al. | 43/18.1 R |
| 5,946,845 A | * 9/1999 | Yasui et al. | 43/18.1 R |
| 5,953,847 A | * 9/1999 | Peterson | 43/24 |
| 5,992,079 A | 11/1999 | Michels et al. | 43/18.1 R |
| 6,000,164 A | * 12/1999 | Maeda | 43/18.1 R |
| 6,108,959 A | * 8/2000 | Tsurufuji et al. | 43/18.1 R |
| 6,125,573 A | 10/2000 | Wilczynski | 43/25 |

FOREIGN PATENT DOCUMENTS

| | | | | |
|---|---|---|---|---|
| GB | 575592 B1 | * | 2/1946 | 43/18.1 R |
| GB | 682096 B1 | * | 11/1952 | 43/18.1 R |
| GB | 1597021 A1 | * | 9/1981 | |
| IT | 552067 B1 | * | 7/1958 | 43/18.1 R |
| RU | 651765 B1 | * | 3/1979 | 43/18.1 CT |

* cited by examiner

*Primary Examiner*—Darren W. Ark
(74) *Attorney, Agent, or Firm*—Wells St. John P.S.

(57) ABSTRACT

A fishing pole has a handle and a rod. The rod is carried by the handle. The rod has a base, an elongated coil spring, a first rod portion and a second rod portion. The elongated coil spring is mounted axially of the rod and adjacent to the base at a proximal end. The first rod portion is carried by the coil spring at a distal end. The first rod portion has a distal tip end terminating in a first line guide. The second rod portion is carried by the rod. The second rod portion has a distal tip end terminating in a second line guide

36 Claims, 10 Drawing Sheets

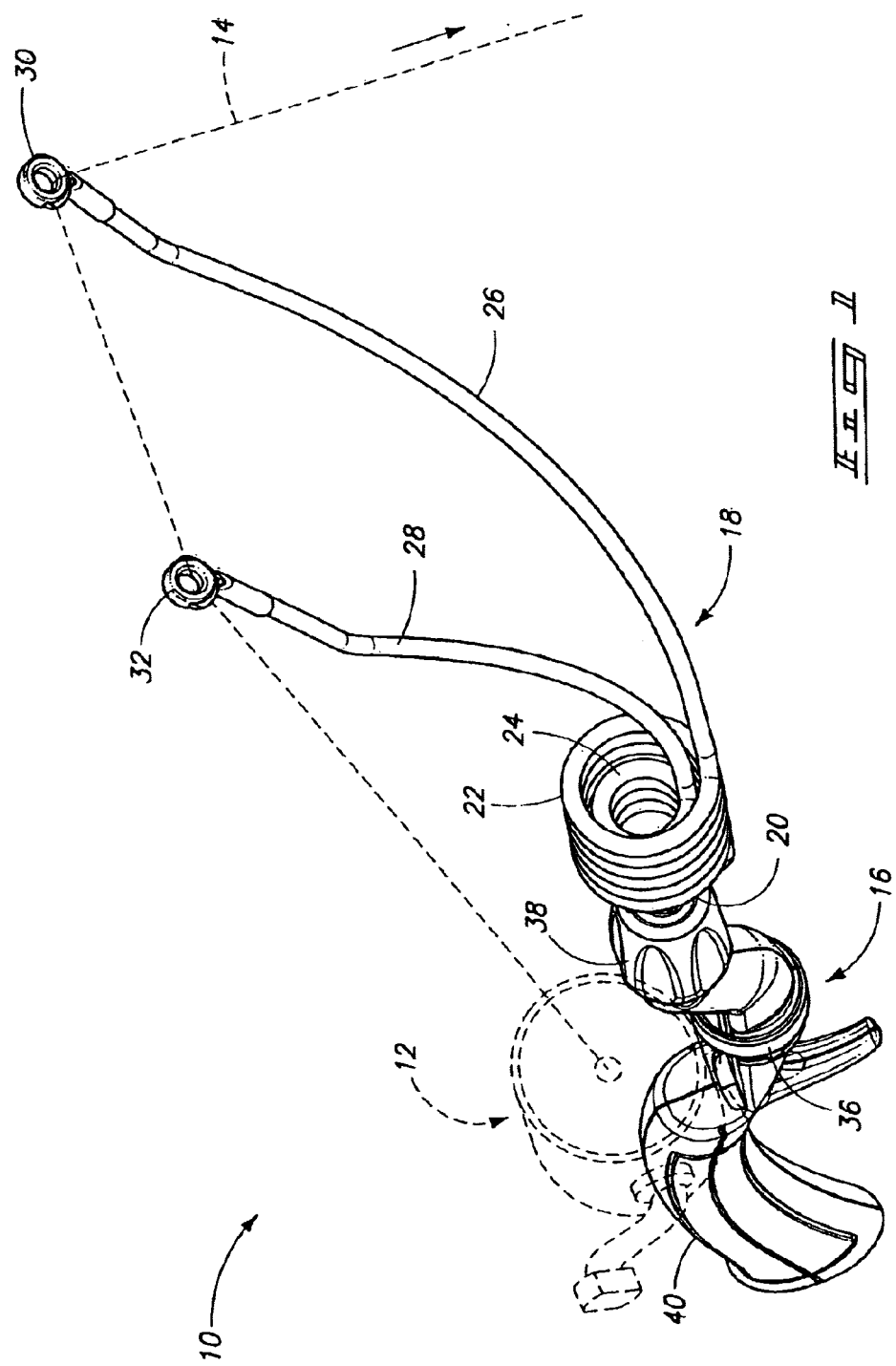

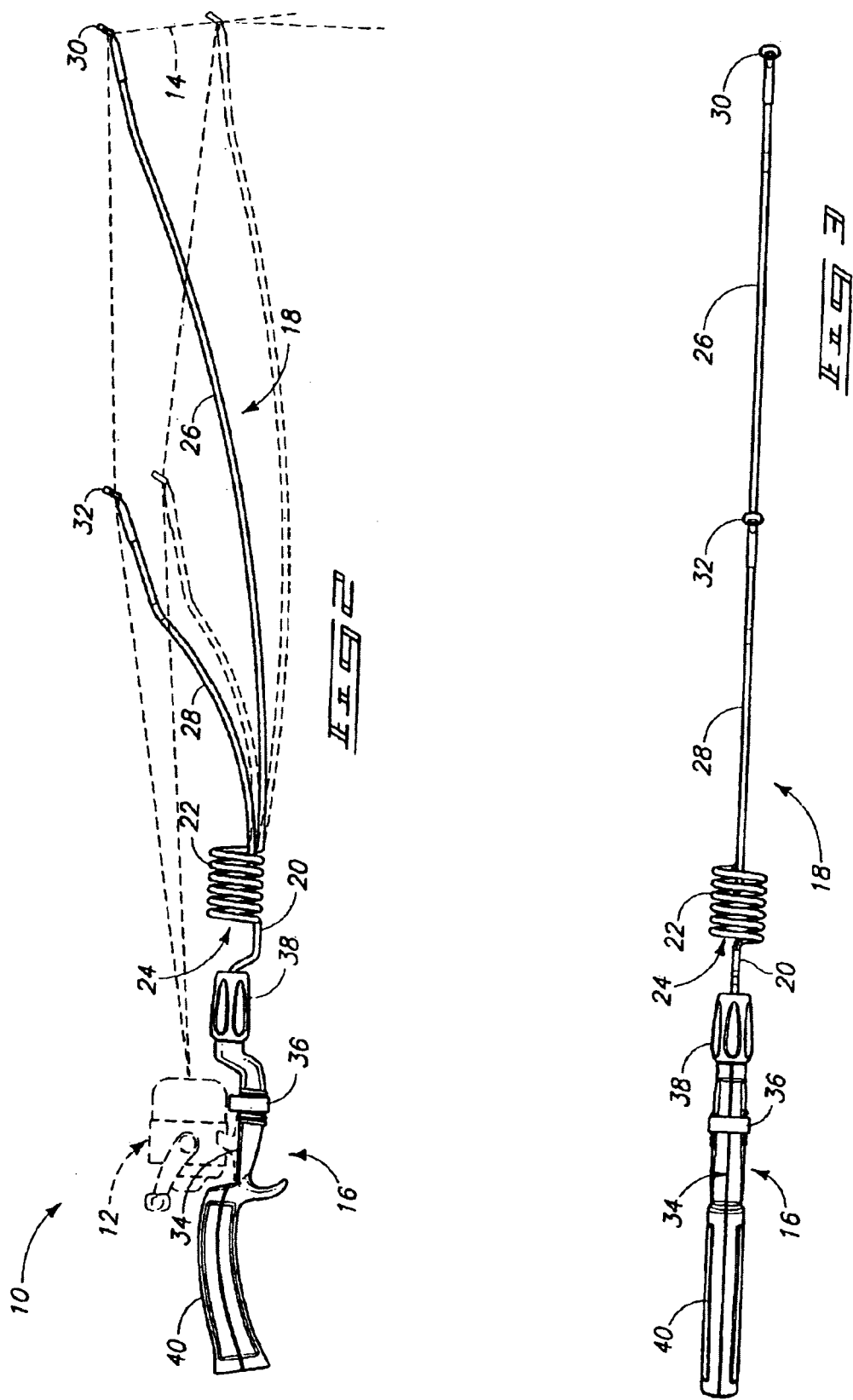

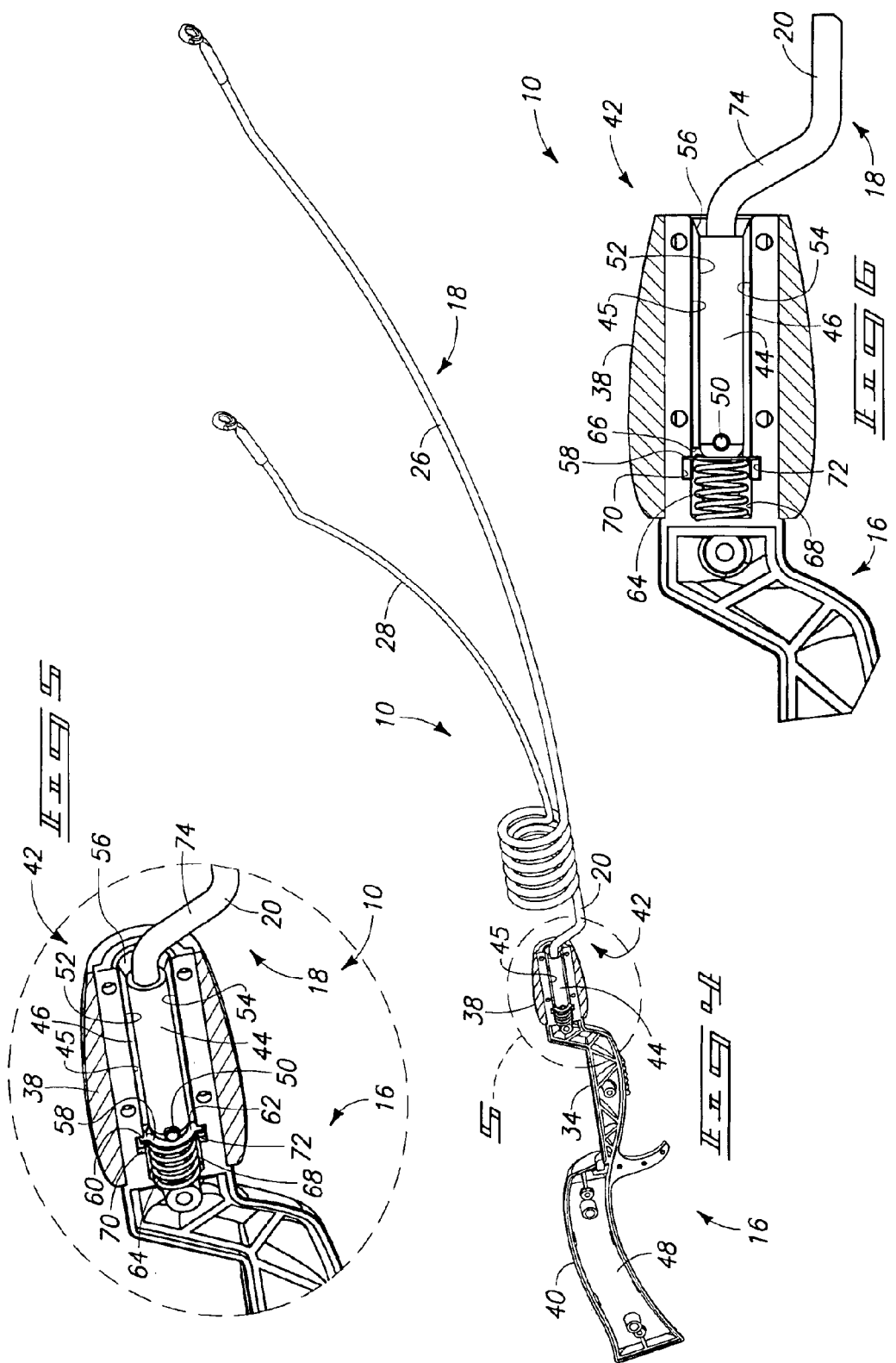

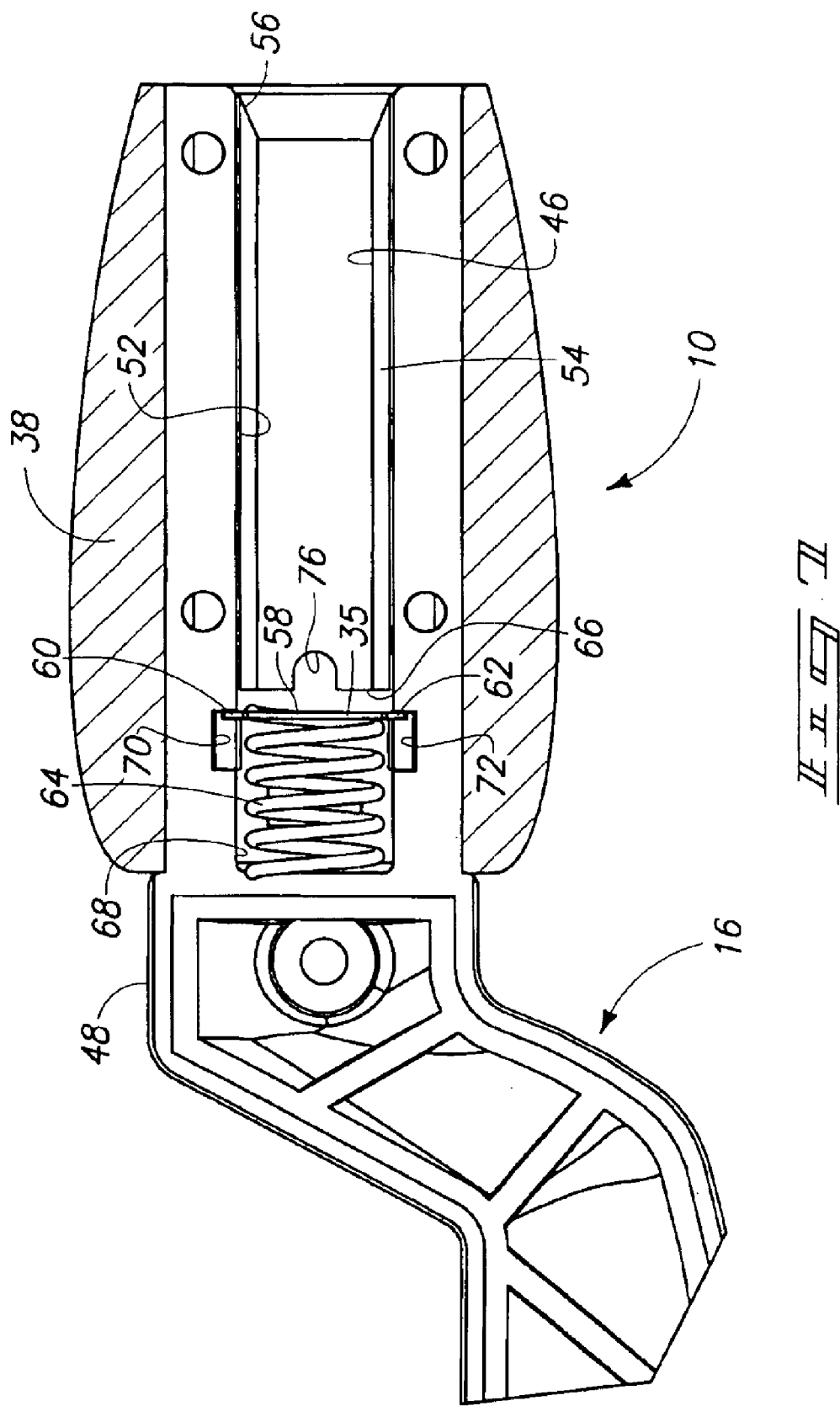

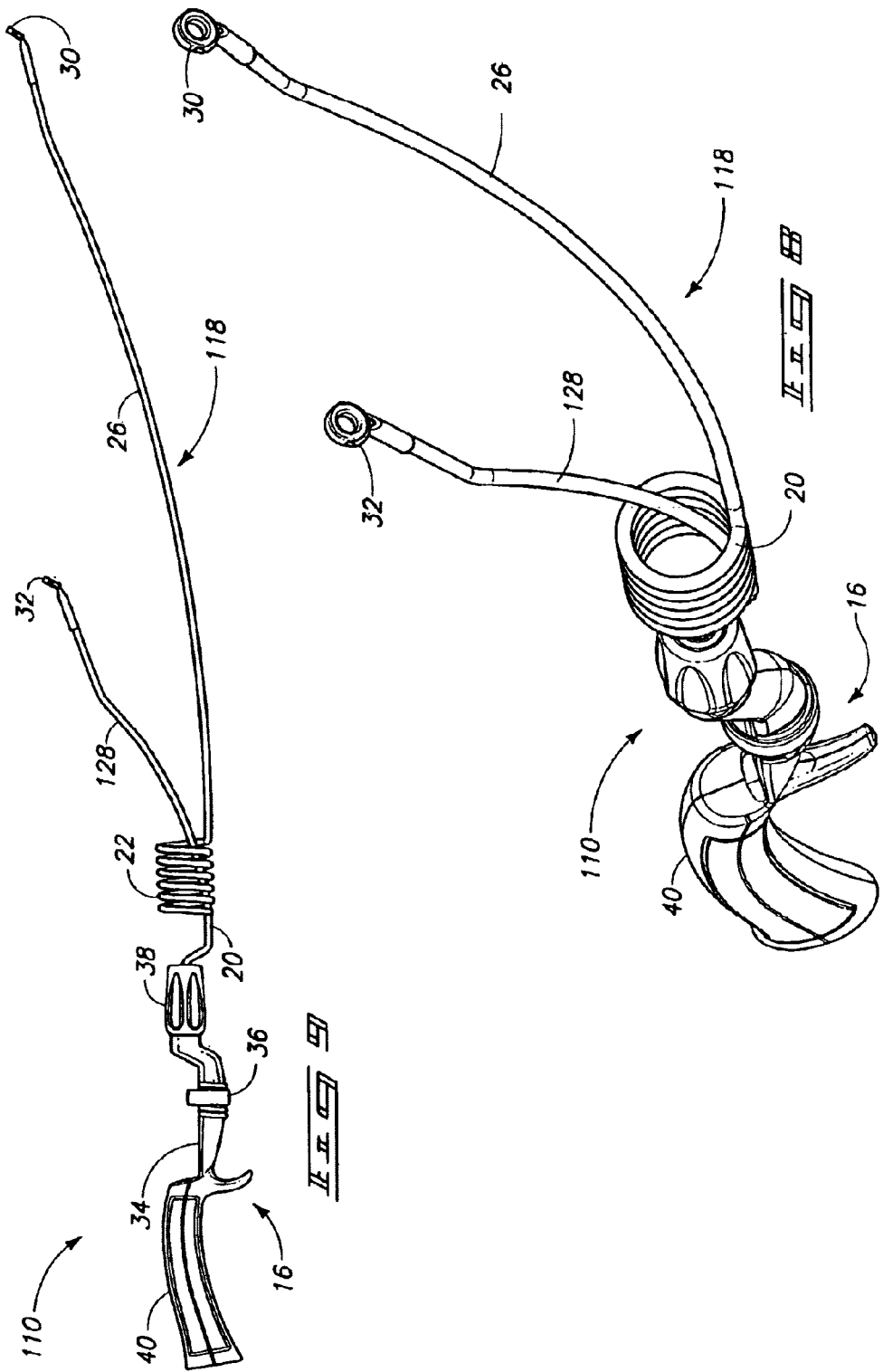

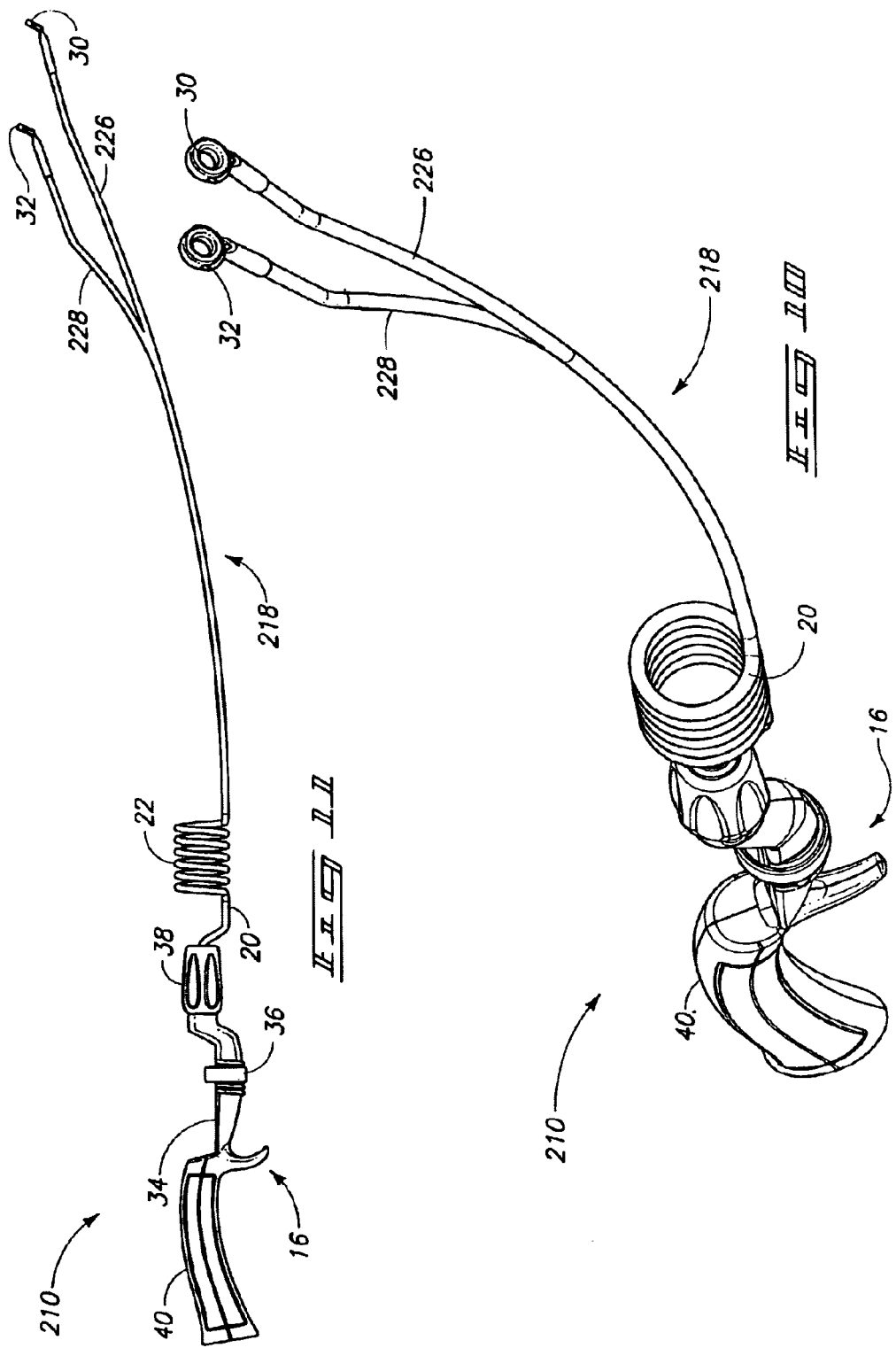

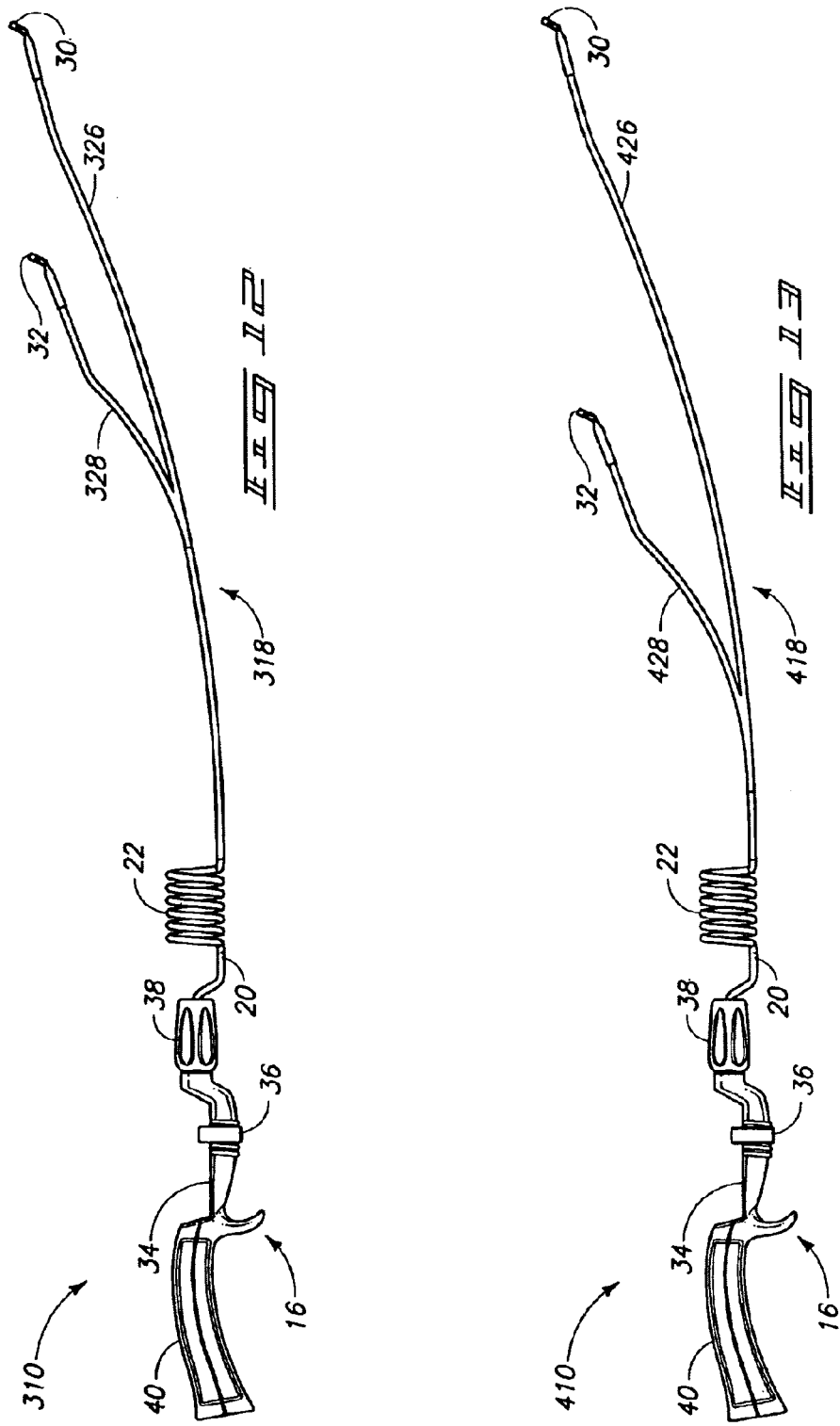

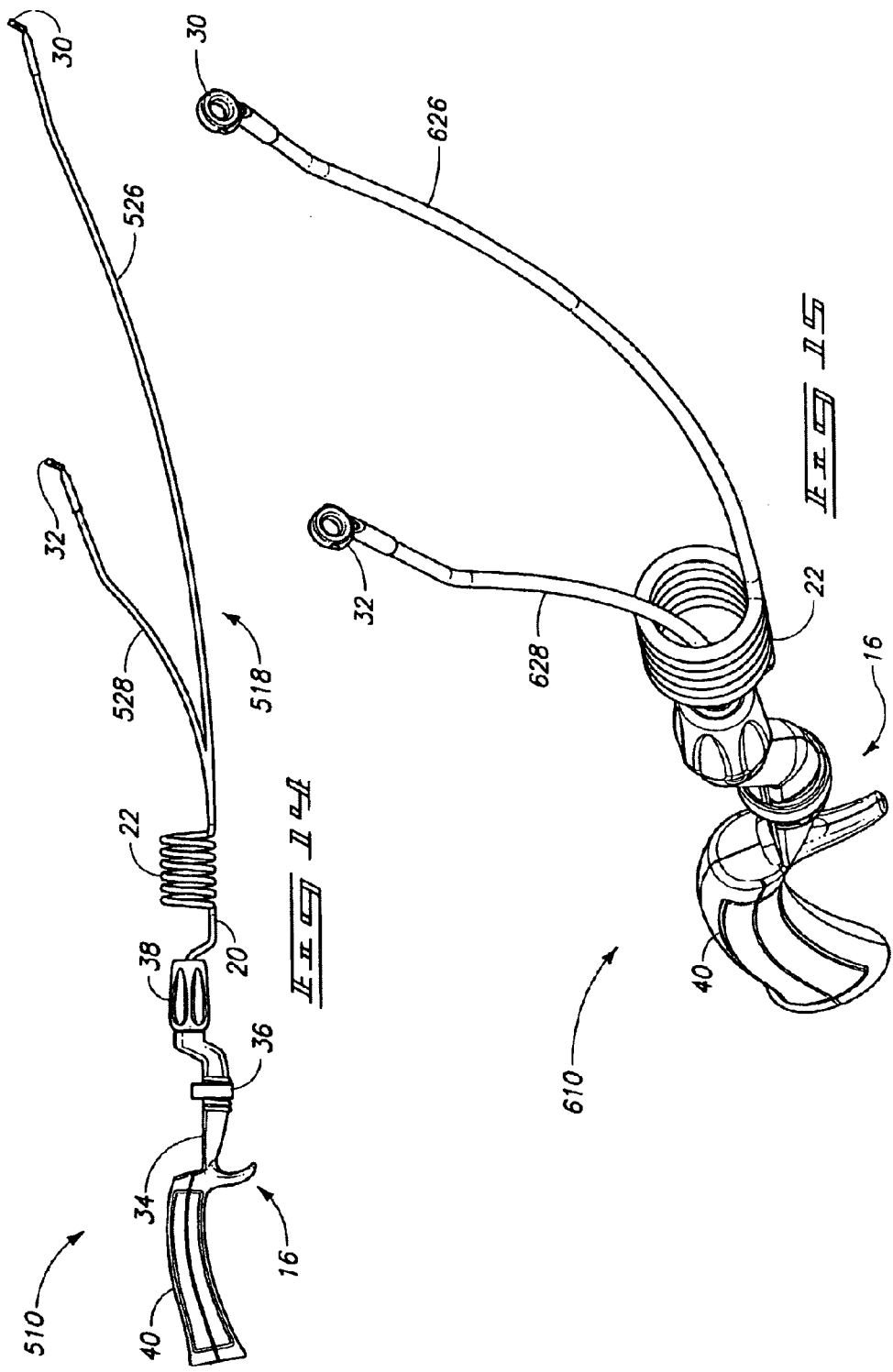

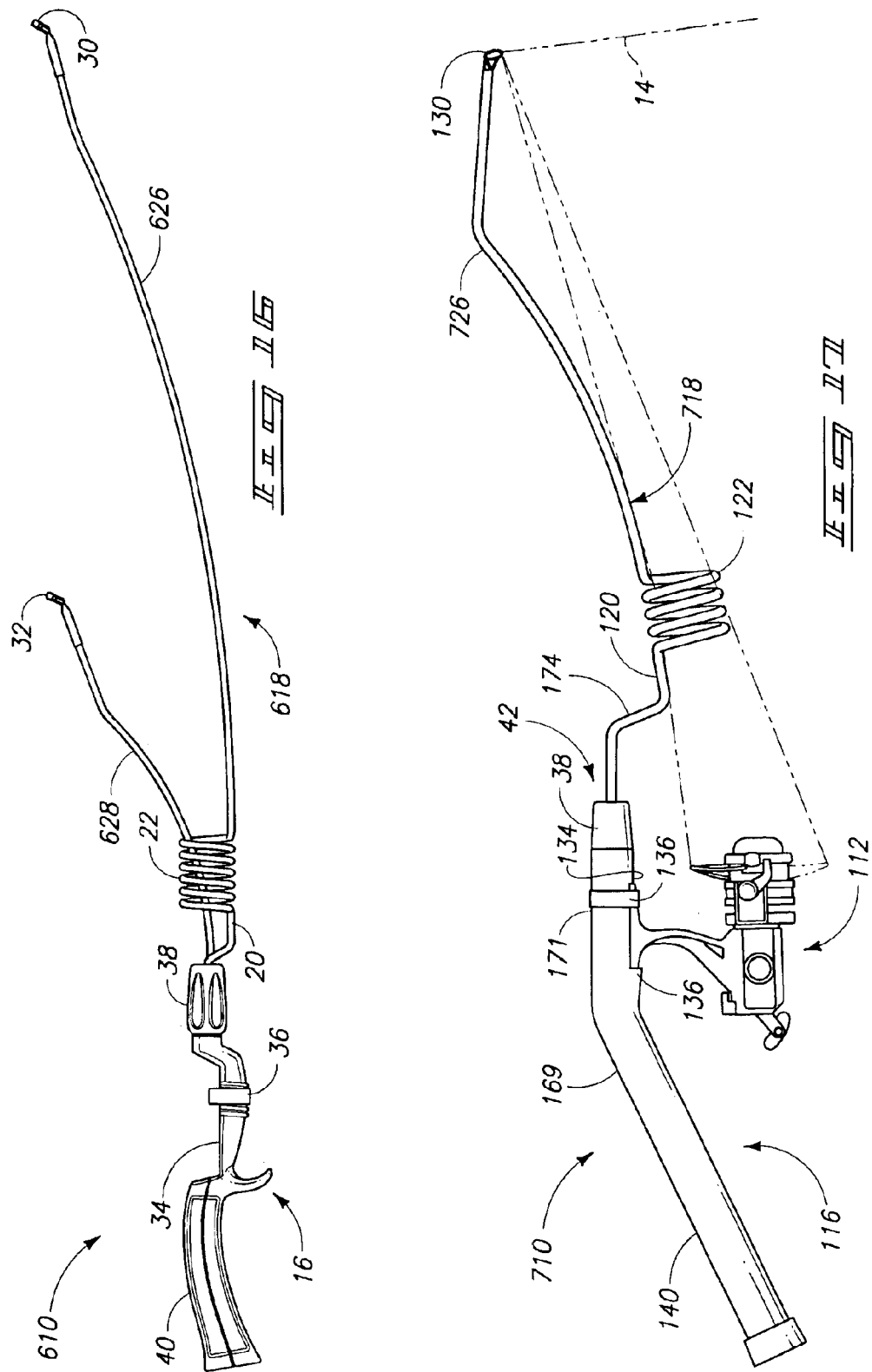

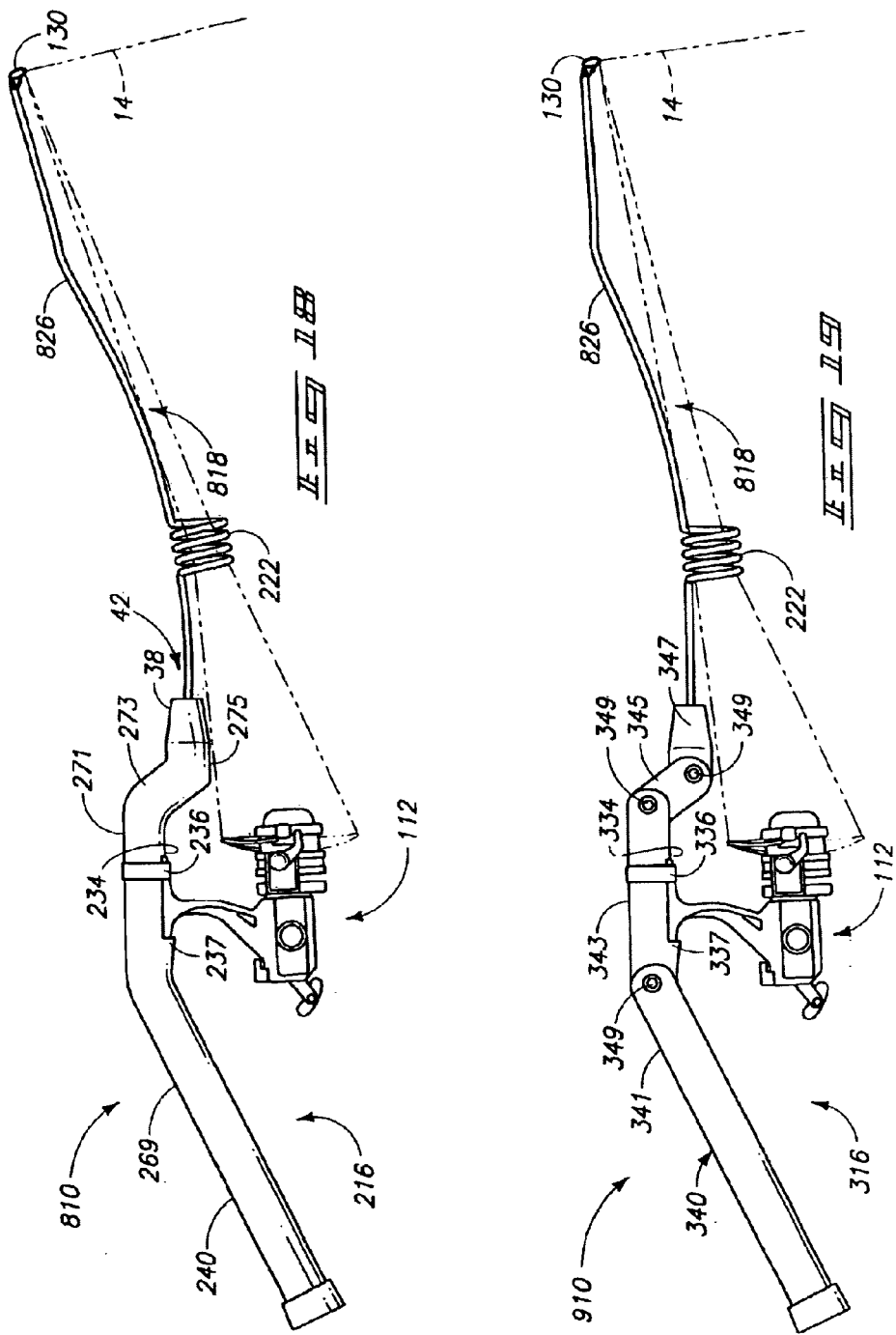

FISHING ROD

TECHNICAL FIELD

The present invention pertains to fishing rods. More particularly, the present invention relates to tips, rods, and handles for fishing rods and to fishing rod assemblies.

BACKGROUND OF THE INVENTION

A typical fishing pole has a handle, a rod, and a plurality of line guides spaced apart along the rod. Typically, the rod is a straight rod. A reel seat is provided on the handle for supporting a fishing reel. Line from the reel is guided along the straight rod via the line guides which are axially aligned along the rod. Line leaves the rod at a distal end via a line guide provided on a tip end of the rod. In many cases, the rod includes a plurality of segments that are joined together with ferrules to enable breakdown and storage of the fishing pole. However, these rods are typically 6, 7, 8 or even 9 feet long which means they are not compact, even when broken down and stowed.

Several attempts have been made to provide a compact fishing pole. U.S. Pat. Nos. 2,541,759; 2,559,934; 2,610,427; 3,216,144; 4,027,419; and 5,444,934 disclose various fishing poles with short rods that attempt to provide benefits of longer rods through various structural features.

U.S. Pat. No. 2,541,759 discloses a fishing pole having a handle that includes an axial extension with a socket for removably receiving a fishing rod. The fishing rod has an end with a bowed portion and a loop that provides resiliency for the bowed portion that attempts to approximate the resiliency of a conventional (and longer) casting rod. However, this fishing pole does not appear to impart additional bending stiffness as the rod is loaded and bent with increasing degree while retrieving a fish. Secondly, the loop forms a coil with a central axis that is transverse to the rod. This coil configuration can snag on tree branches, brush and fishing line.

U.S. Pat. No. 2,559,934 likewise discloses a fishing pole having a handle and a stub rod that is carried by a helically coiled spring. However, the rod does not appear to impart a significant increase in bending stiffness as the degree of bending displacement of the rod is increased when the rod is deformed under load while retrieving a fish.

U.S. Pat. No. 2,610,427 discloses a fishing pole having a relatively short rod including a shaft having a coil spring device adjacent the handle to give greater strength and flexibility. The spring device includes a pair of similar coils disposed in side-by-side relation with a central axis that extends transverse to the rod shaft. However, the fishing rod only has a single tip, and does not appear to provide a significant increase in bending stiffness concomitant with an increase in displacement of the tip end of the rod when retrieving a fish. Secondly, the coil configuration can snag on tree branches, brush and fishing line.

U.S. Pat. No. 3,216,144 discloses a fishing pole having a rod and handle that can be mated in a bait casting configuration and a fly fishing configuration. In the fly fishing configuration, a rod member is affixed to a substantially rigid handle via an axially extending coil spring. The coil is then clamped to the handle, with the coil providing an increase in flexibility of the entire rod length. However, the fishing pole does not appear to provide a significant increase in bending stiffness. The rod and coil are loaded and bent with increasing degree. However, the fishing rod is manufactured from cycalac and does not utilize the benefits of a coil spring in order to mimic action of a longer rod.

U.S. Pat. No. 4,027,419 discloses a fishing pole that includes a reel housing and a rod that is pivotally carried by the housing for compact stowage. The effective length of the rod is relatively short. However, a sensing tip and a support leaf provide a bifurcated end construction which attempts to provide the increased sensitivity of a much longer rod. Both the sensing tip and the support leaf are bowed downwardly in a direction that a fishing line is drawn when retrieving a fish. When retrieving a relatively large fish, the sensing tip bends further downwardly to mate up against an upper face of the support leaf which effectively stiffens up the rod to aid in fighting and landing the fish. According to one construction, the rod is constructed of a composite material.

U.S. Pat. No. 5,444,934 discloses a telescoping or collapsible fishing pole having a handle and a rod; the rod telescopes into a rod-mast. The fishing pole can be used in a partially collapsed manner in restricted areas, such as in ice fishing huts. The rod can also be fully extended for maximum casting power for use in areas where there is a significant amount of clearance or room for use of the rod of the fishing pole. However, the fishing pole does not appear to impart a significant increase in bending stiffness as the rod is bent with increasing degree while retrieving a fish.

Accordingly, improvements are needed to eliminate the above-described deficiencies.

SUMMARY OF THE INVENTION

A fishing pole and a fishing rod are provided with relatively compact overall length, yet having spring action that imparts casting energy comparable to that of a relatively longer fishing rod and fishing pole. Furthermore, several configurations are provided to achieve increasing bending stiffness as the rod is loaded and bent with increasing degree while retrieving a fish. In some cases, one or more coil springs are provided along the rod to impart the action of a longer rod. In other cases, the rod has bifurcated first and second rod portions that terminate in first and second line guides, respectively, having a configuration that provides increasing bending stiffness whereas the first line guide is flexed as angulation of the line begins to apply increasing loading to the second line guide and rod portion as the rod continues to further deform under increasing loads while retrieving a fish.

According to one aspect, a fishing pole has a handle and a rod. The rod is carried by the handle. The rod has a base, an elongated coil spring, a first rod portion and a second rod portion. The elongated coil spring is mounted axially of the rod and adjacent to the base at a proximal end. The first rod portion is carried by the coil spring at a distal end. The first rod portion has a distal tip end terminating in a first line guide. The second line portion is carried by the rod. The second rod portion has a distal tip end terminating in a second line guide.

According to another aspect, a fishing pole is provided with a handle and a rod. The rod is carried by the handle and bowed upwardly of the handle. The rod has a base, a first rod portion and a second rod portion. The first rod portion is carried by the base at a distal end. The first rod portion has a distal tip end terminating in a first line guide. The second rod portion is carried at a proximal end intermediate the first line guide and the base. The second rod portion has a distal tip end terminating in a second line guide.

According to yet another aspect, a fishing rod includes a base, an elongated coil spring, a first rod portion and a second rod portion. The elongated coil spring is mounted axially of the rod adjacent the base at a proximal end. The first rod portion is carried by the coil spring at a distal end. The first rod portion has a distal tip end terminating in a first line guide. The second rod portion is carried by the rod. The second rod portion has a distal tip end terminating in a second line guide.

According to yet another aspect, a fishing rod includes a base portion, a first rod portion and a second rod portion. The first rod portion is carried by the base portion adjacent a distal end. The first rod portion has a distal tip end terminating in a first line guide. The second rod portion is carried at a proximal end intermediate the first line guide and the base. The second rod portion has a distal tip end terminating in a second line guide.

According to even yet another aspect, a fishing pole includes a handle and a rod. The handle has a reel seat provided along a bottom side. The rod is carried by the handle and has a base with an offset portion and is bowed upwardly of the handle. The rod has an elongated coil spring mounted axially of the rod adjacent the base at a proximal end and having a distal tip end terminating in a line guide. The reel seat and the base offset portion are configured to position the coil spring to cooperatively receive a line of a spinning reel on the reel seat so as to provide an intermediate line guide on the rod.

BRIEF DESCRIPTION OF THE DRAWINGS

Preferred embodiments of the invention are described below with reference to the following accompanying drawings.

FIG. 1 is a perspective view of a fishing pole having a fishing rod according to one aspect of the present invention including inner and outer coil springs supporting first and second rod portions, respectively;

FIG. 2 is a side elevational view of the fishing pole and fishing rod of FIG. 1;

FIG. 3 is a plan view of the fishing pole of FIGS. 1 and 2;

FIG. 4 is a partial breakaway perspective view of the fishing pole of FIG. 1;

FIG. 5 is an enlarged view of a fishing pole connector assembly taken from the encircled region 5 of FIG. 4;

FIG. 6 is a vertical sectional view of the connector assembly of FIG. 5;

FIG. 7 is a vertical sectional view of a female connector portion of the connector assembly of FIG. 6;

FIG. 8 is a perspective view of a fishing pole having a fishing rod according to a second aspect of the present invention including a single coil spring supporting a first rod portion and further including a second rod portion being supported in common with the base of the coil spring;

FIG. 9 is a side elevational view of the fishing pole of FIG. 8;

FIG. 10 is a perspective view of a fishing pole having a fishing rod according to a third aspect of the present invention including a single coil spring supporting first and second rod portions with the second rod portion diverging from the first rod portion adjacent a distal end of the rod;

FIG. 11 is a side elevational view of the fishing pole of FIG. 10;

FIG. 12 is a side elevational view of a fourth aspect of the present invention having a single coil spring similar to that shown in FIGS. 10 and 11, but with the second rod portion supported more proximally than in FIGS. 10 and 11;

FIG. 13 is a side elevational view of a fifth aspect of the present invention having a single coil spring similar to that shown in the aspects depicted in FIGS. 10, 11 and 12, but with the second rod portion supported even more proximally than in FIG. 12;

FIG. 14 is a side elevational view of a sixth aspect of the present invention having a single coil spring similar to that shown in the aspects depicted in FIGS. 10–12, but with the second rod portion supported even more proximally than in FIG. 12;

FIG. 15 is a perspective view of a fishing pole having a fishing rod according to a seventh aspect of the present invention including a single coil spring supporting a first rod portion and with a second rod portion being supported in common with the handle of the fishing pole;

FIG. 16 is a side elevational view of the fishing pole of FIG. 15;

FIG. 17 is a side elevational view of a fishing pole having a fishing rod and a fishing handle according to an eighth aspect of the present invention including a coil spring that also acts as a line guide and configured for use with a spinning reel;

FIG. 18 is side elevational view of a fishing pole having a fishing rod and fishing handle according to a ninth aspect of the present invention including a single coil spring configured to support a first rod portion and further act as a line guide and having a handle configured to orient the coil relative to a spinning reel such that the coil can also serve as a line guide;

FIG. 19 is side elevational view of a fishing pole having a fishing rod and fishing handle according to a tenth aspect of the present invention including a single coil spring configured to support a first rod portion and further act as a line guide and having a handle configured to orient the coil relative to a spinning reel such that the coil can also serve as a line guide, but having an articulating handle that enables adjustable positioning of the rod relative to the handle and reel seat to enable coincident placement of the coil spring such that the coil can serve to flex the rod and further serve as a line guide.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to preferred embodiments of Applicant's invention. Eleven exemplary implementations are described below and depicted with reference to the drawings comprising fishing poles having fishing rods according to various aspects of the present invention. A first embodiment is shown and described below in a first configuration with reference generally to FIGS. 1–7. A second embodiment is shown and described below with reference to FIGS. 8–9. A third embodiment is shown and described below with reference to FIGS. 10–11. A fourth embodiment is shown and described below with reference to FIG. 12. A fifth embodiment is shown and described below with reference to FIG. 13. A sixth embodiment is shown and described below with reference to FIG. 14. A seventh embodiment is shown and described below with reference to FIGS. 15 and 16. An eighth embodiment is shown and described below with reference to FIG. 17. A ninth embodiment is shown and described below with reference to FIG. 18. A tenth embodiment is shown and described below with reference to FIG. 19.

While the invention is described by way of ten preferred embodiments, it is understood that the description is not intended to limit the invention to these embodiments, but is intended to cover alternatives, equivalents, and modifications which may be broader than these embodiments such as are defined within the scope of the appended claims.

Furthermore, in an effort to prevent obscuring the invention at hand, only details germane to implementing the invention will be described in great detail, with presently understood peripheral details being incorporated by reference, as needed, as being presently understood in the art.

A preferred embodiment fishing pole in accordance with the invention is first described with reference to FIGS. 1–7 and is identified by reference numeral 10. Fishing pole 10 removably supports a fishing reel 12 onto which fishing line 14 is spooled for removal and retrieval when casting and retrieving a fishing hook (not shown). Fishing pole 10 includes a handle assembly 16 that supports a rod 18. According to one construction, rod 18 is removably supported for mating and demating with handle assembly 16 using a connector assembly. One suitable connector assembly is described below with reference to FIGS. 4–7. An alternative connector assembly is provided by a set of internesting ferrules. According to even another construction, rod 18 is permanently affixed to handle assembly 16.

As shown in FIG. 1, fishing rod 18 includes a base 20 which supports an outer coil spring 22 and an inner coil spring 24. A first rod portion 26 is carried distally of outer coil spring 22. Additionally, a second rod portion 28 is carried distally of inner coil spring 24. Fishing rod 18 has a dual-tip construction wherein first rod portion 26 terminates in a first line guide 30 at a distal end and second rod portion 28 terminates in a second line guide 32 that is provided intermediate first line guide 30 and base 20.

More particularly, FIGS. 1 and 2 illustrate such a dual-tip construction wherein first rod portion 26 is substantially longer than second rod portion 28, and wherein first rod portion 26 and second rod portion 28 diverge from base 20 relative to one another so as to separate rod portions 26 and 28 at the respective distal ends. In order to achieve such a diverging, dual-tip construction, first rod portion 26 and second rod portion 28 each deviate from axial alignment in an upward direction away from a direction of bend that would be imparted by fishing line tension being applied to rod 18 while landing a fish. In essence, each of the first rod portion 26 and the second rod portion 28 comprises an arcuate section that is shaped upwardly and away from a direction of loading when retrieving a fish As shown in FIG. 1–3, handle assembly 16 includes a reel seat 34 which is provided along a top surface. A threaded ring 36 meets with complementary threads on handle assembly 16 to move ring 36 forward and aft along handle assembly 16 to entrap a reel 12 atop reel seat 34, shown in FIGS. 1 and 2. Such a construction of a reel seat 34 is configured for mounting a casting reel 12 atop handle assembly 16. Such constructions for mounting a casting reel onto a handle are well understood in the art. Alternatively, varying other types of reels can be incorporated for mounting onto a reel seat 34 of handle assembly 16.

As shown in FIG. 2, rod 18 is shown in an unloaded state, and is further shown in dashed lines in a deformed state when fishing line 14 is loaded while retrieving a fish. More particularly, first rod portion 26 is initially bent along with coil spring 20. First rod portion 26 is longer than second rod portion 28 such that first line guide 30 is spaced significantly further away than second line guide 32 from reel 12. Hence, a greater bending moment is imparted to first rod portion 26 when a fish loads fishing pole 10. As first rod portion 26 is downwardly deformed, outer coil spring 22 is also deformed until outer coil spring 22 begins to contact with inner coil spring 24. Such contact actually stiffens and strengthens the combination of coil springs 22 and 24 so as to impart some additional bending stiffness to first rod portion 26. Subsequently, first rod portion 26 continues to bend to an even greater degree. As first rod portion 26 is displaced downwardly an ever-increasing amount, angulation of line 14 to second line guide 32 is increased as line 14 leaving second line guide 32 to pass through first line guide 30 (in the deformed downward position) increases the triangulation and loading of second rod portion 28. As this effect is increased, second rod portion 28 is more greatly loaded, which imparts additional bending stiffness to rod 18. Second rod portion 28 is then downwardly bent, along with inner coil spring 24, so as to impart additional bending stiffness to rod 18. Even furthermore, coil spring 24 is loaded to an even greater degree, which adds additional bending stiffness as the rod is further downwardly deformed by loading via line 14.

Also shown in FIGS. 1–3, a receiver 38 is configured to removably receive rod 18 from handle assembly 16 pursuant to the construction depicted in FIGS. 4–7 below. Receiver 38 is provided at a distal end of handle assembly 16, with a handle 40 being provided at a proximal end of handle assembly 16. FIGS. 4–7 illustrate construction of a quick connection assembly 42 that is used to mount rod 18 onto handle assembly 16. Handle assembly 16 is constructed by a pair of left and right handle assembly shells, such as handle assembly shell 48.

Alternatively, handle assembly 16 can be made from a single piece, or from multiple pieces that are attached end-for-end, or by some other means. For example, handle assembly 16 can be made using multiple insert pieces, such as by providing insert piece 46 as a separate piece. Optionally, insert piece 46 can be integrally molded into handle assembly 16 so as to form a half cylinder therein. In order to facilitate an understanding of construction for quick connection assembly 42, only handle assembly shell 48 is shown in FIGS. 4–7, with the opposed handle assembly shell being removed to facilitate viewing therein.

As shown in FIG. 4, a slightly enlarged cylindrical rod end 44 is integrally formed on base 20 of rod 18 and is sized to be axially received within a female receiver 45 of quick connection assembly 42. Accordingly, rod end 44 forms a male receiver that removably mates and demates with female receiver 45. A tubular insert piece 46 provides a mating surface within female receiver 45 for receiving rod end 44, as shown in FIG. 7.

In one case, insert piece 46 is molded or cast into shell 48. In another case, insert piece 46 comprises a half cylinder that is inserted and fastened with rivets, screws, or adhesive into shell 48.

Rod end 44 has a pair of exposed retention pin ends 50 (or a single cross-pin) which extends radially outwardly from the free end of rod end 44, positioned at 3:00 o'clock and 9:00 o'clock positions in assembly. In one case, a single cylindrical pin is press-fit into and through a cross-bore in rod end 44 so that opposed opposite ends of the pin provide pin ends 50. In order to facilitate assembly, female receiver 45 includes a pair of longitudinal slots 52 and 54 that receive rod end 44 of rod 18 rotated 90 degrees from an operating position such that retention pin ends 50 are provided at 12:00 o'clock and 6:00 o'clock positions. Accordingly, retention pin ends (or pins) 50 are received longitudinally and axially within longitudinal slots 52 and 54, after initially receiving rod end 44 within frustoconical entrance portion 56, as shown in FIGS. 5–7. Upon receiving rod end 44 in the rotated, insert position, leading end of rod end 44 is urged against a base plate 58 so as to compress a coil spring 64 of female receiver 45. A pair of dog legs 60 and 62 on base plate 58 restrain motion of base plate 58 between maximum compressed and unpressed positions by way of a pair of slots 70 and 72, as shown in FIGS. 5–7.

An inner end 66 of tubular insert piece 46 of female receiver 45 includes a pair of receiving grooves 76 sized to receive one of retention pin ends 50 securely and rotationally fixed therein, after compressing base plate 58 and coil springs 64 sufficiently to enable rotation of rod 18 and pin ends 50 sufficiently to orient pin ends 50 at the in-use 3:00 o'clock and 6:00 o'clock positions. Accordingly, coil spring 64 urges base plate 58 back into an extended position such that retention pin ends 50 (of FIGS. 5–6) are securely retained within receiving grooves 76 (of FIG. 7). Accordingly, rod 18 of FIG. 4 is securely retained in an in-use position by way of the resulting quick connection assembly 42.

In order to remove rod 18 from handle assembly 16, a user merely axially forces rod 18 into quick connection assembly 42 to cause compression of spring 64, after which the rod is rotated such that pin ends 50 are moved to the 12:00 o'clock and 6:00 o'clock positions, respectively, for removal of rod end 44 and pin ends 50 via the longitudinal slots 52 and 54.

As shown in FIG. 7, spring 64 is provided within a co-axial bore 68 that is formed between the pair of handle assembly shells (where shell 48 provides one of the pair of complementary shells). Similarly, it is understood that tubular insert piece 46 of FIG. 7 forms one piece of two complementary pieces that form a tube within the pair of handle assembly shells. Upon assembling together the shells via fasteners, the pair of handle assembly shells and insert pieces provide for a tubular insert piece that receives and retains rod end 44.

Additionally, as shown in FIG. 6, a kick-down portion 74 is provided along base 20 of rod 18 in order to orient an axial portion of rod 18 in a desired location relative to handle 40 and reel seat 34. As will be understood by an alternative construction depicted in FIG. 17, the length and angle of kick-down portion 74 can be varied in order to modify the relative elevation of the axial portion of the rod relative to the handle, depending on the configuration of fishing reel being utilized in conjunction with the handle.

According to one construction, handle assembly shells, including handle assembly shell 48, are formed from a piece of die cast aluminum. According to another construction, the handle assembly shells are formed from a plastic, or filled plastic material, such as a carbon or graphite filled plastic material or fiberglass material.

FIGS. 8 and 9 illustrate a second aspect of the present invention via an alternatively constructed fishing pole 110. Handle assembly 16 is identical to the handle assembly depicted in the embodiment depicted in FIGS. 1–7. However, fishing rod 118 is constructed in a different manner than rod 18 (of FIGS. 1–7). More particularly, rod 118 includes first rod portion 26 carried at a distal end by outer coil spring 22, wherein coil spring 22 is carried at a proximal end by base 20. Such features are identical to the features provided by rod 18 (of FIGS. 1–7). However, rod 118 has a different construction with respect to the following features; namely, a second rod portion 128 is mounted at a proximal end of coil 22 and is supported by a distal end of base 20. Accordingly, the proximal end of coil 22 and a proximal end of second rod portion 128 are both commonly carried by a distal end of base 20. Hence, only a single coil spring is provided by the present construction of rod 118.

All other materials and construction geometries being equal, rod 118 will impart increased stiffness over rod 18 because first rod portion 26 is relatively resilient when supported by coil spring 22; whereas second rod portion 128 is not supported by a separate, inner coil spring and will have a relatively stiffer bending strength. As first rod portion 26 is loaded and downwardly displaced while landing a fish, second rod portion 128 will begin to carry bending load from a fishing line. However, second rod portion 128 does not have as much resilience as second rod portion 28 (of FIG. 2) because there is no inner coil spring supporting second rod portion 128. Hence, such construction will tend to be somewhat stiffer than the construction depicted in the embodiment of FIG. 2. However, an additional variation in geometry is also present in that second line guide 32 of rod 118 is closer to handle 40 than is second line guide 32 (depicted in the embodiment of FIG. 2). Such effect will tend to make second rod portion 128 of FIG. 9 slightly stiffer than second rod portion 28 of FIG. 2, assuming the materials of the respective portions are similarly constructed.

FIGS. 10–11 illustrate a third aspect of the present invention wherein a fishing pole 210 is depicted having a first rod portion 226 and a second rod portion 228 that are bifurcated near the distal end of rod 218. Accordingly, first rod portion 226 and second rod portion 228 are commonly carried by a distal end of coil spring 22. The proximal end of coil spring 22 supports rod 218 by way of base 20. Handle assembly 16 is constructed in the same manner as the handle assembly depicted in the embodiments of FIGS. 1–9.

As was the case with the previous embodiments depicted in FIGS. 1–9, first rod portion 226 is displaced by the action of landing a fish as fishing line is loaded through line guides 30 and 32. As first rod portion 226 is downwardly displaced, second rod portion 228 begins to carry a significantly greater amount of bending load, resulting from line tension while retrieving a fish. It will be understood that the benefits of the present bifurcated tip construction for rod 218 are reduced over benefits provided by the constructions depicted in the embodiments of FIGS. 1–9. However, additional benefits over the prior art are still provided by the third embodiment construction depicted herein.

FIG. 12, comprising a fishing pole 310, depicts a fourth aspect of the present invention having first rod portion 326 and second rod portion 328 which are slightly longer than the respective rod portions depicted in the embodiment of FIGS. 10–11. Accordingly, the bifurcated tip assembly provided by rod portions 326 and 328 separate, or bifurcate, more proximately along rod 318 than do the respective portions for the embodiment of FIGS. 10 and 11. Additionally, first rod portion 326 and second rod portion 328 are commonly carried by distal end of coil spring 22. The proximal end of coil spring 22 is commonly carried by base 20, and handle assembly 16 is similar to the handle assembly depicted in the embodiments of FIGS. 1–11.

FIG. 13 illustrates a fifth aspect of the present invention comprising a fishing pole 410, having a fishing rod 418 with a first rod portion 426 and a second rod portion 428 that are bifurcated even more proximally to coil spring 22 than is the embodiment depicted in FIG. 12.

FIG. 14 depicts a sixth aspect of the present invention comprising a fishing pole 510 having a fishing rod 518 with first rod portion 526 and second rod portion 528 bifurcated yet even closer to coil spring 22 than is the embodiment depicted in FIG. 13.

Accordingly, the embodiments of FIGS. 10–11, 12, 13, and 14 present fishing rods having bifurcated tips with progressively longer bifurcated tip portions, and carried by a common coil spring. As the tips become progressively longer, the overall bending characteristics of the respective rod when retrieving a fish are found to vary. Accordingly, a user can select the embodiment that best optimizes a desired rod bending characteristic based upon the desired stiffness and characteristics that are achieved by the respective version of the fishing rod and fishing pole.

FIGS. 15 and 16 illustrate a seventh aspect of the present invention comprising a fishing rod 610 having a first rod portion 626 carried at a distal end by coil spring 22, wherein the coil spring 22 is carried at a proximal end by base 20. Handle assembly 16 is constructed similar to the handle assemblies embodiments depicted in FIGS. 1–14. However, second rod portion 628 extends within and carefully through coil spring 22, and is carried at a proximal end of base 20 such that second rod portion 628 flexes and bends within coil spring 22 when loaded during retrieval of a fish via fishing line.

FIG. 17 illustrates an eighth aspect of the present invention comprising a fishing pole 710 having an alternatively constructed handle assembly 116 as well as an alternatively constructed fishing rod 718. Handle assembly 116 includes handle 140 which has a horizontal portion 171 that terminates at a distal end in the form of receiver 38 and which forms a downwardly depending portion 169 at a proximal end. Handle assembly 116 also includes a reel seat 134 provided along a bottom surface of the horizontal portion for receiving a spinning reel 112 with a reel finger slot 137 provided at a proximal end of reel seat 134. A rotating ring 136 is threaded onto the horizontal portion of handle 140 for retaining spinning reel 112 thereunder against reel seat 134 and within finger slot 137. An additional ring or a forward reel seat retainer is provided forward of ring 136 to trap reel 112 onto seat 134.

As shown in FIG. 17, receiver 38 forms part of a quick connection assembly 42 which was described in detail with reference to the embodiment depicted in FIGS. 1–7.

Rod 718 includes a relatively large kick-down portion 174 along base 120. Coil spring 122 is affixed to base 120 at a proximal end and rod portion 726 is carried by a distal end of coil spring 122. Coil spring 122, in contrast to the previously described embodiments, is provided so as to depend downwardly of a central portion of rod 726 in a configuration that enables use of coil spring 122 as an intermediate line guide of rod 718. Furthermore, a line guide 130 is provided at a terminating end of rod portion 726. Furthermore, rod portion 726 is bowed upwardly as rod 718 extends away from handle 140 towards line guide 130.

As shown in FIG. 17, reel seat 134 is substantially parallel to a distal end of base 120 and coil spring 122. Kick-down portion 174 is sized sufficiently relative to reel seat 134 and coil spring 122 such that line leaving spinning reel 112 is aligned to draw through the inside of coil spring 122 such that the coil spring serves both as an elastic element of rod 718, and also as an intermediate line guide provided between spinning reel 112 and line guide 130.

FIG. 18 illustrates a ninth alternative construction for a fishing pole 810 having a handle assembly 216 and a rod 818. Rod 818 is similar to rod 718 (of FIG. 17) wherein a coil spring 222 is configured and positioned along rod 818 so as to provide a line guide intermediate terminating line guide 130 and spinning reel 112. However, rod 818 has an upwardly bowed rod portion 826, but does not have a kick-down portion similar to kick-down portion 174 (of FIG. 17). Instead, handle assembly 216 includes a downwardly depending proximal portion 269, a horizontal portion 271, a downwardly depending distal portion 273 and a distal, terminating horizontal portion 275. Horizontal portion 275 includes the receiver 38 which forms part of a quick connection assembly 42. Accordingly, handle 240 is formed as an integral piece including portions 269, 271, 273 and 275. Handle 240 and rod 818 cooperate to place reel 112 in a position so line 14 passes through coil spring 222. Reel seat 234, finger slot 237, and threaded ring 236 cooperate to retain reel 112 onto handle assembly 216.

FIG. 19 illustrates a tenth alternative construction for a fishing pole 910 having a handle assembly 316 that includes a handle 340 with a plurality of handle portions 341, 343, 345, and 347 that are adjustably positioned by way of a plurality of recessed hex-head fasteners 349 into a plurality of different positions. Each threaded fastener 349 is loosened to position a respective joint, then tightened to lock the joint. As shown in FIG. 19, handle 340 has been configured in a position similar to the position of handle 240 (of FIG. 18). According to such configuration, handle 340 positions fishing rod 818 at a location relative to reel seat 334 such that the coil spring on rod 818 provides an intermediate line guide between line guide 130 and spinning reel 112. Accordingly, coil spring 222 provides a flexible member at the base of rod portion 826 and further provides for an intermediate line guide along rod 818. Reel seat 334, finger slot 337, and threaded ring 336 cooperate to retain reel 112 onto handle assembly 316.

Accordingly, the previous ten embodiments depict various fishing poles that present the action of a relatively long pole, such as a six or seven-foot long fishing pole, in the package size of a two to four-foot long fishing pole. Because of the relative shortness of the various embodiments of fishing poles, the shortness and spring action of the resulting poles impart an amateur (with very little practice) with the ability to cast with relative pin-point accuracy. Additionally, the various embodiments show the ability to remove a handle from a fishing rod to facilitate easy storage in a tackle box, a glove box, a saddlebag, or a small storage container. Additionally, because of the relatively easy ability to separate the rod from the handle, an ability is imparted to change between different fishing rods for an existing fishing pole. For example, different length fishing rods can be provided with a common fishing pole. Likewise, the ability can be provided to change between embodiments by providing different fishing rods. For example, one fishing rod might have two coil springs, whereas another fishing rod has a single coil spring. Likewise, the configuration of single and multiple tips can be switched by merely switching between the selected fishing rod that is joined to the fishing handle. Even furthermore, the ability to provide a relatively short fishing pole enables multiple individuals to fish at a crowded location, such as on a small fishing boat, where the casting room required is significantly reduced by the relatively short fishing pole length.

Even furthermore, the provision of multiple tips in an upward, arcuate manner and the provision of one or more coil springs provide an adjustable, increasing bending stiffness that enables a relatively short fishing pole to be used to catch small fish, as well as to be used to catch relatively larger fish as the bending stiffness of the rod can be tailored to increase sufficiently for a larger size fish as the rod is further deformed.

Even furthermore, the relatively short fishing pole configurations depicted in the previous ten embodiments enable multiple casting techniques. For example, a user can cast from above, can cast with a side arm presentment, or can even cast from between their legs due to the relatively short fishing pole length. Accordingly, such a fishing pole will work very well in brushy, treed areas, where there is virtually no room overhead or laterally in order to present and cast the fishing pole. Accordingly, such a fishing pole is ideally suited for use by hikers, backpackers, horseback riders, and off-road personal vehicle users. Such compact size makes transportation and carrying of the configuration easy, especially in the disassembled state, to locations that are relatively hard to access. Even furthermore, such a relatively short configuration can be ideally suited for use when ice fishing.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A fishing pole, comprising:
   a handle; and
   a rod having a base, an elongated coil spring supported by the base, a first rod portion and a second rod portion, the rod supported by the handle, a proximal end of the first rod portion supported by the coil spring and having a distal tip end terminating in a first line guide, the second rod portion supported by the rod so as to form a fork between the first rod portion and the second rod portion, and the second rod portion having a distal tip end terminating in a second line guide.

2. The fishing pole of claim 1 wherein the second rod portion extends intermediate and adjacent the first rod portion.

3. The fishing pole of claim 1 wherein the coil spring comprises a first coil spring and further comprising a second coil spring provided coaxially within the first coil spring.

4. The fishing pole of claim 3 wherein the second rod portion is carried by the second coil spring at a distal end of the second coil spring.

5. The fishing pole of claim 1 wherein a portion of the first rod portion is curved in an upward, convex direction away from a direction of bend imparted by fishing line tension applied while landing a fish.

6. The fishing pole of claim 5 wherein a portion of the second rod portion is curved in an upward direction away from a direction of bend imparted by fishing line tension applied while landing a fish.

7. The fishing pole of claim 1 wherein the first rod portion comprises an arcuate section extending upwardly and away from a direction of loading when retrieving a fish.

8. The fishing pole of claim 1 wherein the handle comprises a reel seat provided on top side of the handle.

9. The fishing pole of claim 1 wherein the distal tip end of the first rod portion is spaced apart from the distal tip end of the second rod portion.

10. The fishing pole of claim 9 wherein the distal tip end of the first rod portion diverges from the distal tip end of the second rod portion.

11. The fishing pole of claim 1 wherein the elongated coil spring comprises a cylindrical coil spring.

12. The fishing pole of claim 11 wherein the cylindrical coil spring comprises an outer cylindrical coil spring, and further comprising an inner cylindrical coil spring carried within the outer cylindrical coil spring, the inner cylindrical coil spring having a proximal end supported by the base and a distal end configured to support a proximal end of the second rod portion.

13. The fishing pole of claim 1 wherein the coil spring has a proximal end affixed to the base of the rod.

14. The fishing pole of claim 13 wherein the coil spring has a distal end affixed to the proximal end of the first rod portion.

15. The fishing pole of claim 1 wherein the first rod portion and the second rod portion converge nearer together where the proximal end of the first rod portion is supported by the coil spring and the proximal end of the second rod portion is supported by the rod, and diverge apart at the distal end of the first rod portion and the distal end of the second rod portion.

16. The fishing pole of claim 1 wherein the second rod portion is carried by the coil spring.

17. The fishing pole of claim 1 wherein the second rod portion is carried by the base adjacent a proximal end of the coil spring.

18. The fishing pole of claim 1 wherein the second rod portion is carried by the base.

19. The fishing rod of claim 1 wherein the second pole portion is carried by the rod at a location spaced apart distally of a distal end of the coil spring.

20. The fishing rod of claim 1 wherein the second pole portion is carried by a distal end of the coil spring.

21. A fishing rod, comprising:
    a base;
    an elongated coil spring having a proximal end carried by the base and having a distal end;
    a first rod portion having a distal tip end terminating in a first line guide and having a proximal end carried by the spring; and
    a second rod portion having a proximal end carried by the rod and a distal tip end terminating in a second line guide;
    wherein the second rod portion is supported from the rod so as to extend from an interior of the distal end of the coil spring and the second rod portion forms a separate branch from the rod relative to the first rod portion.

22. The fishing rod of claim 21 wherein the first rod portion is bowed upwardly, away from a direction of load applied to the rod when retrieving a fish.

23. The fishing rod of claim 22 wherein the second rod portion is bowed upwardly, away from a direction of load applied to the rod when retrieving a fish.

24. The fishing rod of claim 21 wherein the coil spring comprises one coil spring and further comprising another coil spring, wherein the another coil spring is provided coaxially within the one coil spring, and the second rod portion is carried by a distal end of the another coil spring.

25. The fishing rod of claim 24 wherein the proximal end of the second rod portion is supported by a distal end of the another coil spring, and a proximal end of the another coil spring is affixed to the base.

26. The fishing rod of claim 25 wherein the one coil spring and the another coil spring each comprise a cylindrical coil spring, and wherein the another coil spring is smaller in diameter than the one coil spring.

27. The fishing rod of claim 21 wherein the proximal end of the first rod portion is carried by a distal end of the elongated coil spring.

28. The fishing rod of claim 27 wherein the elongated coil spring comprises cylindrical coil spring.

29. The fishing rod of claim 28 wherein the cylindrical coil spring has a central axis that is offset from an adjacent axis extending between the base and the proximal end of the first rod portion.

30. The fishing rod of claim 21 wherein the proximal ends of the first rod portion and the second rod portion converge, and wherein the distal ends of the first rod portion and the second rod portion diverge so as to form a diverging fork between the first rod portion and the second rod portion.

31. The fishing rod of claim 21 wherein the second rod portion is carried adjacent a proximal end of the coil spring.

32. A fishing pole comprising:

a handle; and a rod with a base, a coil spring supported by the base, an arcuate, upwardly extending first rod portion and an arcuate, upwardly extending second rod portion, the rod supported by the handle, a proximal end of the first rod portion affixed to a distal end of the coil spring and having a distal tip end terminating in a first line guide, the second rod portion carried by the rod so as to exit from within the coil spring and having a distal tip end terminating in a second line guide;

wherein the second rod portion extends arcuately, upwardly in a smaller radial arc than does the first rod portion so as to provide a diverging fork configuration extending from the proximal end of each of the first and second rod portions and toward the distal tip end of each of the first and second rod portions.

33. The fishing pole of claim 32 wherein the second rod portion comprise an arcuate portion and a substantially linear distal end portion providing the distal tip end.

34. The fishing pole of claim 33 wherein the first rod portion comprises an arcuate portion and a substantially straight distal end portion configured to provide the distal tip end.

35. The fishing pole of claim 34 wherein the first rod portion and the second rod portion diverge further apart from the proximal ends of the first rod portion and the second rod portion and toward the distal ends of the first rod portion and the second rod portion.

36. The fishing pole of claim 32 wherein the handle comprises a reel seat provided atop the handle.

* * * * *

UNITED STATES PATENT AND TRADEMARK OFFICE
CERTIFICATE OF CORRECTION

PATENT NO. : 6,931,781 B2
DATED : August 23, 2005
INVENTOR(S) : Duane C. Markley and Ron Stokes It is certified that error appears in the above-identified patent and that said Letters Patent is hereby corrected as shown below:

<u>Title page,</u>
Item [56], References Cited, U.S. PATENT DOCUMENTS, delete "2,559,834 A  7/1951  Briney", and insert -- 2,559,934 A  7/1951  Briney --; and delete "3,270,457 A  *  9/1966  Wells", and insert -- 3,270,457 A  *  9/1966  Austin --.

<u>Column 11,</u>
Line 61, after "provided on", insert -- a top side --.

<u>Column 13,</u>
Line 5, after "spring comprises", insert -- a cylindrical --.

<u>Column 14,</u>
Line 10, delete "portion comprise an", and insert -- portion comprises an --.

Signed and Sealed this

Twenty-fifth Day of April, 2006

JON W. DUDAS
*Director of the United States Patent and Trademark Office*